(12) United States Patent
Tian et al.

(10) Patent No.: US 9,053,359 B2
(45) Date of Patent: Jun. 9, 2015

(54) METHOD AND SYSTEM FOR DOCUMENT AUTHENTICATION USING KRAWTCHOUK DECOMPOSITION OF IMAGE PATCHES FOR IMAGE COMPARISON

(75) Inventors: Yibin Tian, Menlo Park, CA (US); Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 392 days.

(21) Appl. No.: 13/491,462

(22) Filed: Jun. 7, 2012

(65) Prior Publication Data
US 2013/0329965 A1    Dec. 12, 2013

(51) Int. Cl.
  G06K 9/46    (2006.01)
  G06K 9/62    (2006.01)
  H04N 1/40    (2006.01)
  G06K 9/00    (2006.01)

(52) U.S. Cl.
  CPC .......... G06K 9/00442 (2013.01); G06K 9/6212 (2013.01)

(58) Field of Classification Search
  None
  See application file for complete search history.

(56) References Cited

U.S. PATENT DOCUMENTS

| | | | |
|---|---|---|---|
| 3,846,755 A | 11/1974 | Hart | |
| 4,183,013 A | 1/1980 | Agrawala et al. | |
| 4,790,024 A | 12/1988 | Peppers et al. | |
| 5,245,674 A | 9/1993 | Cass et al. | |
| 5,303,313 A | 4/1994 | Mark et al. | |
| 5,539,840 A | 7/1996 | Krtolica et al. | |
| 5,748,780 A * | 5/1998 | Stolfo | 382/232 |
| 5,765,176 A * | 6/1998 | Bloomberg | 715/209 |
| 5,778,095 A | 7/1998 | Davies | |
| 5,809,167 A | 9/1998 | Hussein | |
| 5,848,191 A * | 12/1998 | Chen et al. | 382/229 |
| 5,850,490 A * | 12/1998 | Johnson | 382/306 |
| 6,020,972 A | 2/2000 | Mahoney et al. | |

(Continued)

FOREIGN PATENT DOCUMENTS

JP    2007088693 A  *  4/2007

OTHER PUBLICATIONS

"Image Analysis by Krawtchouk Moments," Pew-Thian Yap et al, IEEE Transactions on Image Processing, vol. 12, No. 11, Nov. 2003, pp. 1367-1377.*

(Continued)

*Primary Examiner* — Wenpeng Chen
(74) *Attorney, Agent, or Firm* — Chen Yoshimura LLP

(57) ABSTRACT

A document authentication method employs Krawtchouk decomposition to analyze and compare document images. When printing an original document, the original document image is segmented into image patches, which preferably correspond to individual symbols of the document. Krawtchouk decomposition is applied to each image patch. The image patches are classified into image patch classes using their Krawtchouk coefficients. The locations of all image patches belonging to each class are obtained and stored along with the Krawtchouk coefficients for each class. When authenticating a target document, the same segmentation, Krawtchouk decomposition and classification steps are applied to the target document image, and the locations of all image patches belonging to each class are obtained. The image patch classes and the locations of image patches belonging to each class for the original and target document image are compared to detect alterations present in the target document.

22 Claims, 3 Drawing Sheets

(56) References Cited

U.S. PATENT DOCUMENTS

| | | | |
|---|---|---|---|
| 6,244,508 B1* | 6/2001 | Straub | 235/449 |
| 6,272,245 B1* | 8/2001 | Lin | 382/195 |
| 6,567,530 B1* | 5/2003 | Keronen et al. | 382/100 |
| 6,766,056 B1* | 7/2004 | Huang et al. | 382/190 |
| 6,785,405 B2* | 8/2004 | Tuttle et al. | 382/112 |
| 6,907,527 B1* | 6/2005 | Wu | 713/176 |
| 7,263,219 B2* | 8/2007 | Ikenoue | 382/164 |
| 7,664,321 B2* | 2/2010 | Fukuoka et al. | 382/181 |
| 8,238,665 B2* | 8/2012 | Sankarasubramaniam et al. | 382/184 |
| 8,339,619 B2* | 12/2012 | Misawa | 358/1.13 |
| 8,542,904 B1* | 9/2013 | Beutel et al. | 382/133 |
| 2002/0129006 A1* | 9/2002 | Emmett et al. | 707/1 |
| 2004/0223197 A1* | 11/2004 | Ohta et al. | 358/538 |
| 2005/0018845 A1* | 1/2005 | Suzaki | 380/243 |
| 2006/0045386 A1* | 3/2006 | Fukuoka et al. | 382/305 |
| 2007/0230784 A1 | 10/2007 | Nakamura | |
| 2008/0301767 A1* | 12/2008 | Picard et al. | 726/2 |
| 2009/0119010 A1 | 5/2009 | Moravec | |
| 2009/0154778 A1* | 6/2009 | Lei et al. | 382/112 |
| 2010/0142807 A1* | 6/2010 | Yasuda et al. | 382/164 |
| 2010/0153843 A1* | 6/2010 | Sankarasubramaniam et al. | 715/273 |
| 2010/0259777 A1* | 10/2010 | Suzuki | 358/1.11 |
| 2010/0275111 A1* | 10/2010 | Bastos dos Santos et al. | 715/227 |
| 2010/0310123 A1 | 12/2010 | Fahn et al. | |
| 2011/0080618 A1* | 4/2011 | Viswanathan et al. | 358/3.28 |
| 2011/0135203 A1* | 6/2011 | Iwamoto et al. | 382/192 |
| 2011/0242617 A1* | 10/2011 | King et al. | 358/474 |
| 2011/0249897 A1 | 10/2011 | Chaki et al. | |
| 2011/0307438 A1* | 12/2011 | Fernández Martínez | 706/52 |
| 2012/0051645 A1 | 3/2012 | Sun | |
| 2012/0300982 A1* | 11/2012 | Tanase et al. | 382/103 |
| 2012/0301015 A1* | 11/2012 | Tanase et al. | 382/159 |
| 2013/0050765 A1* | 2/2013 | Zhan et al. | 358/3.01 |
| 2013/0129188 A1* | 5/2013 | Zhang et al. | 382/144 |

OTHER PUBLICATIONS

"JBIG2", Wikipedia, http://en.wikipedia.org/wiki/JBIG2, 5 pages, printed from the Internet on Dec. 2, 2012.

Weideman et al., "A Comparison of a Nearest Neighbor Classifier and a Neutral Network for Numeric Handprint Character Recognition", Proceedings of International Joint Conference on Neural Networks, Jun. 18-22, 1989, vol. 1, pp. 117-120.

* cited by examiner

| 0 | 0 |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |

Fig. 2(a)

| Distance d | | Small characters | | | | | | | | | |
|---|---|---|---|---|---|---|---|---|---|---|---|
| | | *0* | *1* | *2* | *3* | *4* | *5* | *6* | *7* | *8* | *9* |
| Large characters | *0* | 32 | 176 | 150 | 94 | 184 | 119 | 98 | 191 | 76 | 90 |
| | *1* | 175 | 19 | 177 | 154 | 170 | 201 | 186 | 225 | 177 | 170 |
| | *2* | 149 | 181 | 30 | 127 | 216 | 163 | 169 | 186 | 148 | 139 |
| | *3* | 112 | 148 | 129 | 40 | 192 | 129 | 127 | 192 | 92 | 121 |
| | *4* | 166 | 151 | 209 | 181 | 42 | 188 | 165 | 204 | 165 | 185 |
| | *5* | 123 | 195 | 160 | 135 | 203 | 44 | 118 | 206 | 121 | 120 |
| | *6* | 94 | 189 | 166 | 120 | 186 | 86 | 44 | 212 | 91 | 103 |
| | *7* | 193 | 220 | 182 | 196 | 208 | 201 | 209 | 26 | 192 | 198 |
| | *8* | 74 | 180 | 146 | 89 | 180 | 104 | 89 | 192 | 43 | 101 |
| | *9* | 99 | 174 | 147 | 118 | 203 | 118 | 114 | 199 | 108 | 35 |

Fig. 2(b)

Fig. 2(c)
| Distance d | | Target characters | | | | | | | | | |
|---|---|---|---|---|---|---|---|---|---|---|---|
| | | *1* | *2* | *3* | *4* | *5* | *6* | *7* | *8* | *9* | *0* |
| Original characters | *1* | 6 | 135 | 133 | 125 | 143 | 181 | 134 | 171 | 149 | 173 |
| | *2* | 137 | 5 | 129 | 149 | 140 | 177 | 146 | 154 | 138 | 153 |
| | *3* | 133 | 129 | 9 | 133 | 100 | 152 | 133 | 125 | 148 | 128 |
| | *4* | 125 | 149 | 135 | 11 | 152 | 166 | 163 | 155 | 171 | 171 |
| | *5* | 141 | 141 | 100 | 153 | 8 | 120 | 138 | 150 | 157 | 140 |
| | *6* | 180 | 176 | 151 | 168 | 121 | 8 | 178 | 138 | 136 | 125 |
| | *7* | 134 | 149 | 136 | 168 | 140 | 180 | 9 | 170 | 176 | 161 |
| | *8* | 172 | 156 | 127 | 153 | 150 | 140 | 172 | 9 | 157 | 122 |
| | *9* | 153 | 143 | 147 | 173 | 157 | 135 | 178 | 160 | 11 | 127 |
| | *0* | 170 | 162 | 127 | 162 | 137 | 124 | 158 | 123 | 126 | 14 |
Fig. 2(d)
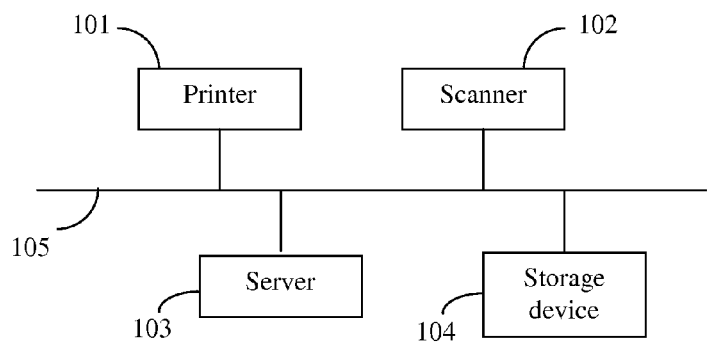
Fig. 3

METHOD AND SYSTEM FOR DOCUMENT AUTHENTICATION USING KRAWTCHOUK DECOMPOSITION OF IMAGE PATCHES FOR IMAGE COMPARISON

BACKGROUND OF THE INVENTION

1. Field of the Invention

This invention relates to document authentication, and in particular, it relates to a method for comparing documents employing Krawtchouk decomposition of image patches.

2. Description of Related Art

In situations where an original document, either in electronic form or in hardcopy form, is printed or copied to produce a hardcopy document, and the hardcopy document is distributed and circulated, there is often a need to determine whether a hardcopy document (referred to as the target document in this disclosure) is an authentic copy of the original, i.e., whether the hardcopy document has been altered while it was in circulation. A goal in many document authentication methods is to detect what the alterations (additions, deletions) are. Alternatively, some document authentication methods determine whether or not the document has been altered, without determining what the alterations are.

Various types of document authentication methods are known. One type of such method performs a digital image comparison of a scanned image of the target document with an image of the original document. In such a method, the image of the original document is stored in a storage device at the time of printing or copying. Alternatively, the image or data derived from the image may be stored in barcodes (in particular, two-dimensional (2d) barcodes) that are printed on the document itself or on the back of the sheet. Later, a target hardcopy document is scanned, and the stored image of the original document is retrieved from the storage device or the barcodes and compared with the scanned image of the target document. In addition, certain data representing or relating to the original document, such as a document ID, may also be stored in the storage device. The same data may be encoded in barcodes which are printed on the hardcopy document when the copy is made, and can be used to assist in document authentication.

SUMMARY

The present invention is directed to a document authentication method that uses Krawtchouk decomposition to analyze image patches that contain characters.

An object of the present invention is to provide a fast and accurate method of comparing two document images.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a document authentication method implemented in a data processing system, which includes: (a) obtaining an original document image representing an original document; (b) segmenting the original document image into a plurality of original image patches; (c) performing Krawtchouk decomposition for each original image patch to generate a set of Krawtchouk coefficients for each original image patch; (d) classifying the plurality of original image patches into a plurality of original image patch classes using the Krawtchouk coefficients generated in step (c), each original image patch class being defined by a set of Krawtchouk coefficients, each original image patch being classified into one and only one original image patch class, to generate list of locations of original image patches belonging to each original image patch class; wherein the Krawtchouk coefficients for each original image patch class and the list of locations of original image patches belonging to each original image patch class constitute original image patch classification data; and (e) storing the original image patch classification data.

In another aspect, the present invention provides a document authentication method implemented in a data processing system, which includes: (f) obtaining a target document image representing a target document; (g) segmenting the target document image into a plurality of target image patches; (h) performing Krawtchouk decomposition for each target image patch to generate a set of Krawtchouk coefficients for each target image patch; (i) classifying the plurality of target image patches into a plurality of target image patch classes using the Krawtchouk coefficients generated in step (h), each target image patch class being defined by a set of Krawtchouk coefficients, each target image patch being classified into one and only one target image patch class, to generate a list of locations of target image patches belonging to each target image patch class, wherein the Krawtchouk coefficients for each target image patch class and the list of locations of target image patches belonging to each target image patch class constitute target image patch classification data; (j) retrieving original image patch classification data which has been generated for an original document image, the original image patch classification data comprising Krawtchouk coefficients for each of a plurality of original image patch classes and a list of locations of original image patches belonging to each original image patch class; and (k) detecting alterations in the target document image relative to the original document image by comparing the target image patch classification data and the original image patch classification data. In this method, step (k) may include: (k1) matching the plurality of target image patch classes with the plurality of original image patch classes, by comparing their respective Krawtchouk coefficients, to detect any original image patch classes that do not match any target image patch classes and any target image patch classes that do not match any original image patch classes; and (k2) for each target image patch class that matches an original image patch class, matching the list of locations of target image patches belonging to that target image patch class with the list of locations of original image patches belonging to that original image patch class to detect any locations of original image patches that do not match any locations of target image patches and any locations target image patches that do not match any locations of original image patches.

In another aspect, the present invention provides a computer program product comprising a computer usable non-transitory medium (e.g. memory or storage device) having a computer readable program code embedded therein for controlling a data processing system, the computer readable program code configured to cause the data processing system to execute the above methods.

It is to be understood that both the foregoing general description and the following detailed description are exemplary and explanatory and are intended to provide further explanation of the invention as claimed.

BRIEF DESCRIPTION OF THE DRAWINGS

FIG. 2(a) illustrates a test image and FIG. 2(b) illustrates a test result using the test image.

FIG. 2(c) illustrates a test image and FIG. 2(d) illustrates a test result using the test image.

FIG. 3 schematically illustrates a data processing system in which embodiments of the present invention may be implemented.

DETAILED DESCRIPTION OF PREFERRED EMBODIMENTS

Figure 1:
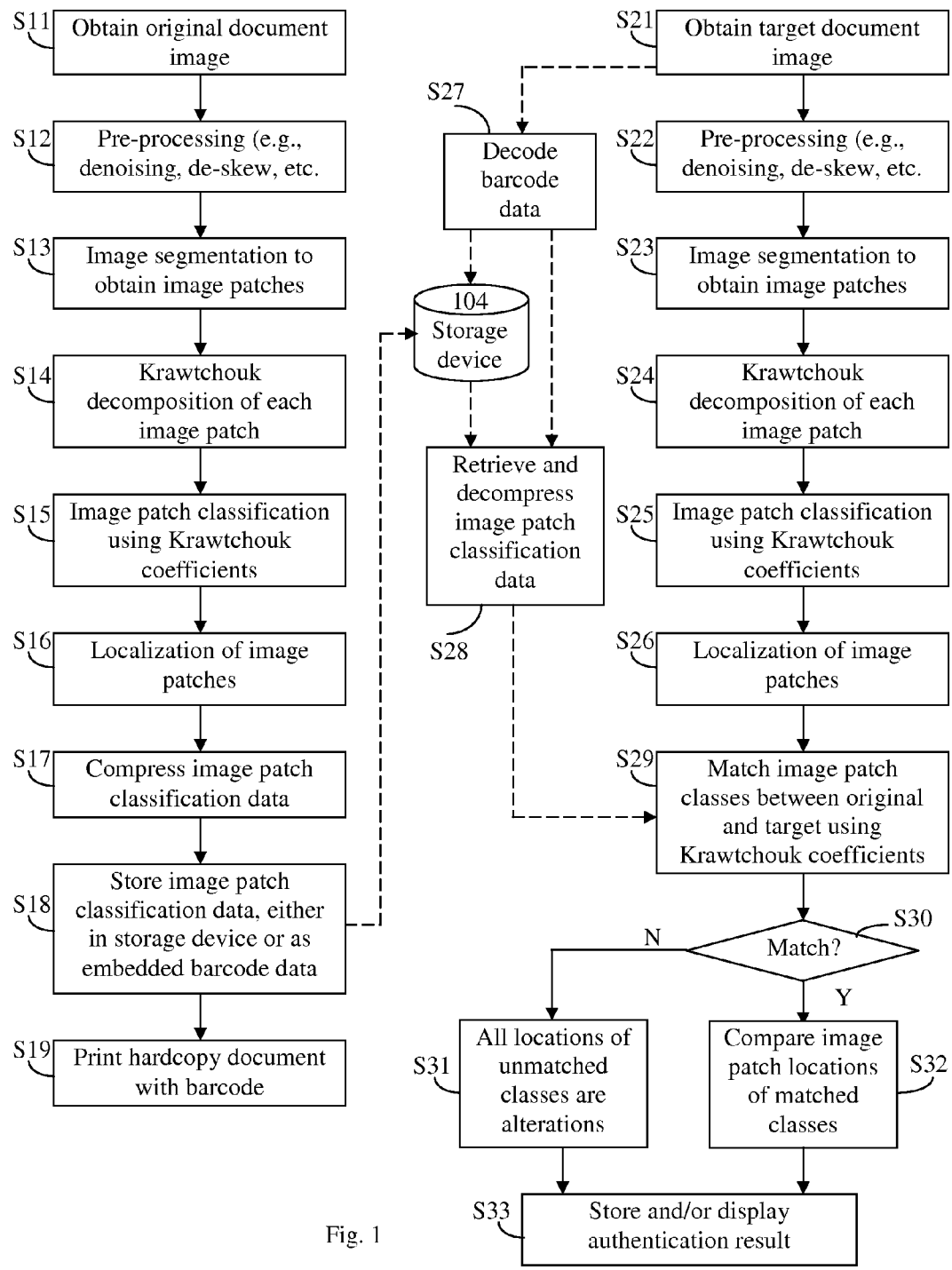
FIG. 1 schematically illustrates a document authentication method according to an embodiment of the present invention.

Embodiments of the present invention employ Krawtchouk (also translated as Kravchuk) decomposition to analyze and compare document images for document authentication. Krawtchouk decomposition is applied to units of the document image referred to as image patches. In a preferred embodiment, the image patches correspond to individual characters and/or pseudo-character symbols of the document. The pseudo-character symbols may come from imperfect character segmentation, printing and scanning noise or other distortions during document circulation, such as symbols consisting of two connected characters or broken characters. In an alternative embodiment, some image patches may correspond to individual words of the document.

In addition to Krawtchouk decomposition, other suitable decomposition methods using orthogonal polynomials such as Zernike polynomials may be employed. The descriptions below use Krawtchouk decomposition as an example.

When an original document is printed or copied to produce a hardcopy, an image of the original document (original document image) is processed by employing Krawtchouk decomposition. The original document image is first segmented into image patches, and each image patch is decomposed using Krawtchouk decomposition. After further processing, described in more detail later, the result of the processing is stored, e.g., in a storage device in electronic forms and/or encoded in barcodes and printed on the same medium as the document (e.g., in the margins, on the back side, etc.) When authenticating a target hardcopy document, a scanned image of the target document (target document image) is processed, including applying Krawtchouk decomposition, in the same manner as the original document image. The result of the processing of the target document image is compared to the stored result of the processing of the original document image to determine whether the target document is authentic.

FIG. 1 schematically illustrates a document authentication method according to an embodiment of the present invention. Steps S11 to S19 are processing steps performed at the time of printing the hardcopy document (the printing stage), and steps S21 to S33 are performed at the time of authenticating a target hardcopy document (the authentication stage).

In the printing stage, an original document image (electronic form) is obtained first (step S11). This may be by scanning an original hardcopy document, by generating it from another electronic document (e.g., producing an image from a word processing document), or by receiving the original document image from another electronic source. If the original document image is obtained by scanning, it may be pre-processed (step S12), such as by applying denoising and de-skew processes. If the original document image is generated by converting from a word processing or other electronic documents, such pre-processing is typically not required.

Then, the original document image is segmented to obtain image patches (step S13). Many document image segmentation methods are known, and any suitable methods can be used for the segmentation step S13. For example, document image segmentation may be accomplished by segmenting the image in progressive steps, first into paragraphs, then into lines, and then into individual characters or into individual words. As stated earlier, in a preferred embodiment, the image patches obtained by step S13 correspond to individual characters (including characters, numbers, special symbols, pseudo-character symbols explained earlier, etc.; more generally, they are collectively referred to as "symbols") of the document. As a result of this step, a plurality of image patches are obtained.

It should be noted that image segmentation processes can be applied to different types of languages. The definitions of characters or words may vary among different languages. For example, in Indo-European languages, words are formed of a linear sequence of one or multiple characters with spaces between words, while in certain East Asian languages, each character is considered a word.

Further, if the document includes non-character images or graphics, each image or graphic may be treated as an image patch. Alternatively, a different image comparison method (such as feature-based comparison) may be applied to images or graphics.

For each image patch, Krawtchouk decomposition is applied (step S14), as described in detail below.

A two-dimensional discrete function i(x,y) can be decomposed into a number of components using discrete Krawtchouk polynomials as basis functions:

$$i(x,y)=\sum_{m=0}^{M-1}\sum_{n=0}^{N-1}c(m,n)*k_{M,N}(m,n;p_x,p_y;x,y) \quad (1)$$

where M and N are the dimensions of i(x,y), m and n the orders of Krawtchouk polynomials, $k_{M,N}(m,n; p_x,p_y; x,y)$ the Krawtchouk polynomial of dimensions M and N and orders m and n, and c(m,n) the corresponding Krawtchouk coefficient. $p_x$ and $p_y$ control location of the polynomial origin, where $0<p_x<1$, $0<p_y<1$.

An image patch can be treated as a two-dimensional function. In such a case, M and N are the dimensions (number of pixels) of the image patch.

In one embodiment of the present invention, $p_x=p_y=0.5$ are used; in another embodiment, the relative location of the centroid of the image patch is used as the polynomial original.

To implement Krawtchouk decomposition for image patches, the following mathematical manipulation may be applied. If the pixel values of an image patch are rearranged as a vector, Eq. (1) above may be written in matrix form as:

$$\begin{bmatrix} i(1) \\ i(2) \\ i(3) \\ i(4) \\ \vdots \\ i(T) \end{bmatrix}' = \begin{bmatrix} c(1) \\ c(2) \\ c(3) \\ c(4) \\ \vdots \\ c(L) \end{bmatrix}' \begin{bmatrix} k(0,0;1) & k(0,0;2) & \ldots & k(0,0;T) \\ k(0,1;1) & k(0,1;2) & \ldots & k(0,1;T) \\ k(1,0;1) & k(1,0;2) & \ldots & k(1,0;T) \\ k(1,1;1) & k(1,1;2) & \ldots & k(1,1;T) \\ \vdots & \vdots & \ddots & \vdots \\ k(u,v;1) & k(u,v;2) & \ldots & k(u,v;T) \end{bmatrix} \quad (2)$$

where T=M*N is the total number of pixels in the image patch, and L=(u+1)*(v+1) the total number of Krawtchouk terms used for image decomposition. While the maximum number of Krawtchouk terms for an M*N image patch is M*N, the decomposition shown in Eq. (2) is cut off at (u+1)*(v+1) terms, where u+1≤M and v+1≤N. When more Krawtchouk terms are used, computation is more intensive and the comparison described below will be more sensitive to noise. But if too few Krawtchouk terms are used, the decomposition may not adequately express the character shape of the image patch. The values of u and v may be determined empirically. Alternatively, they may be automatically determined by suitable algorithms.

For example, a threshold of Krawtchouk reconstruction errors can be set for some representative characters, and the number of Krawtchouk terms is chosen such that the least number of Krawtchouk terms are used and the reconstruction errors are within the threshold. This can be done iteratively by incrementally adding higher order Krawtchouk terms and checking whether the reconstruction errors are reduced to be within the threshold. Here the reconstruction errors can be calculated as certain distances (such as Euclidean distance) between the original and the reconstructed image patches (see Eq. (4) and related discussion below for a definition of the distance).

For simplicity, Eq. (2) may be written as:

$$I = CK \quad (2')$$

where $$I = [\,i(1)\ \ i(2)\ \ \ldots\ \ i(T)\,]$$

$$C = [\,c(1)\ \ c(2)\ \ \ldots\ \ c(L)\,]$$

$$K = \begin{bmatrix} K(0,0;1) & K(0,0;2) & \ldots & K(0,0;T) \\ K(0,1;1) & K(0,1;2) & \ldots & K(0,1;T) \\ K(1,0;1) & K(1,0;2) & \ldots & K(1,0;T) \\ K(1,1;1) & K(1,1;2) & \ldots & K(1,1;T) \\ \vdots & \vdots & \ddots & \vdots \\ K(u,v;1) & K(u,v;2) & \ldots & K(u,v;T) \end{bmatrix}$$

To obtain Krawtchouk coefficients, a pseudo-inverse matrix operation can be applied to Eq. (2):

$$C = IK'(KK')^{-1} \quad (3)$$

Here K' represents the transpose of K.

Eq. (3) is used to perform Krawtchouk decomposition (step S14) for each image patch, represented by I, to generate a set of Krawtchouk coefficients C for the image patch.

Prior to applying Eq. (3), as a part of step S14, the image patch is normalized or resized to a predetermined standard size so that all image patches have the same M, N values.

Based on the Krawtchouk decomposition, the image patches of the original document image are classified into a collection of image patch classes (step S15). The collection of classes is built up for each image as the image patches are classified. The first image patch is considered a new class, and the class is registered by storing the set of Krawtchouk coefficients for that image patch. For each subsequent image patch, it is determined whether the image is in the same class as one of the existing (i.e. already registered) classes. This is accomplished by comparing the Krawtchouk coefficients of the current image patch with those of each existing class.

In one embodiment, the comparison of Krawtchouk coefficients is done by calculating a distance between two sets of Krawtchouk coefficients. For example, the distance may be in the form of Minkowski distance:

$$d = \left\{ \sum_{j=1}^{L} |C_1(j) - C_2(j)|^\beta \right\}^{\frac{1}{\beta}} \quad (4)$$

where $C_1(j)$ and $C_2(j)$ are the $j^{th}$ Krawtchouk coefficients of the two sets being compared. In this instance, $C_1(j)$ are for the current image patch and $C_2(j)$ are for the image patch class that the current image patch is being compared to. $\beta$ may be any value. In one embodiment, $\beta = 2$ (Euclidean distance); in another embodiment, $\beta = 1$ (Manhattan distance). Further, other suitable definitions of a distance may be used.

If the calculated distance d between the current image patch and an existing class is less than a threshold value $d_{th1}$, the current image patch is considered to belong to that existing class. The threshold value may be determined empirically. Alternatively, each existing class may have its own threshold value. If the current image patch does not belong to any of the existing classes, it is deemed to be a new class and the new class is registered by storing the set of Krawtchouk coefficients of the current image patch.

In one implementation, the values of Krawtchouk coefficients for each image patch class are updated as each image patch is classified into the class, so that the Krawtchouk coefficients for the class are certain statistical values (for example, mean or median) for all image patches classified into that class.

Using this process, a collection of image patch classes is built and each image patch of the original document image is classified into one of the classes. The number of Krawtchouk terms and the distance threshold value $d_{th1}$ should be selected such that each image patch will be classified into one and only one image patch class. For example, if the distance threshold value $d_{th1}$ is such that some image patches would belong to two or more image patch classes, the distance threshold value $d_{th1}$ should be reduced. Further, number of Krawtchouk terms and the distance threshold value $d_{th1}$ should be selected such that image patches corresponding to the same symbol will be classified as being in the same class. For example, if too many Krawtchouk terms are used and/or the distance threshold value $d_{th1}$ is too small, noise in the image may cause the same symbol to be classified into different classes (i.e. two or more classes may be generated for the same symbol). In such cases, the number of Krawtchouk terms should be reduced and/or the distance threshold value $d_{th1}$ should be increased.

As stated earlier, in this disclosure, the term "symbols" broadly includes all characters, numbers, special symbols, pseudo-character symbols, including upper and lower case, characters of different fonts, etc. For example, the same letter written in different fonts may be considered different symbols and be classified into different classes because their shapes or sizes are different. When the various parameters are properly selected, the result of the classification process S15 will be a one-to-one correspondence between the image patch classes and the unique symbols used in the document.

The inventor conducted a test using a binary original image, shown in FIG. 2(a), which contains two columns of characters 0 to 9 of different sizes. The image patches were subject to Krawtchouk decomposition (Eqs. (1)-(3)). For the Krawtchouk decomposition, all characters were normalized to 51×51 pixels (that is, M=51, N=51 in Eq. (1)); only the orders of 0 to 9 of the Krawtchouk coefficients were used (that is, u=9, v=9 in Eq. (2) and the L is 100); and $p_x$ and $p_y$ were both set to 0.5. The distances between the Krawtchouk coefficients of pairs of image patches in the first and second columns were then calculated using Eq. (4), with $\beta=1$. The result is shown in FIG. 2(b). It can be seen that the distance d between pairs of same characters in different columns were much smaller than the distance d between pairs of different characters, by a factor of two or more in most cases. This demonstrates that, in the classification step S15, a threshold value can be set to adequately distinguish image patches that belong or do not belong to a particular class.

Further, the location of each image patch is obtained and recorded (step S16). The locations may actually be obtained in the image segmentation step S13 when the original document is segmented into image patches; in step S16, the locations of the image patches are recorded in association with the classes they belong to. In other words, as a result of repeating steps S15 and S16 for all image patches, a list of image patch classes is generated, each class being defined by a set of Krawtchouk coefficients and having associated with it a list of locations of all image patches belonging to that class (this data is referred to as the image patch classification data in this disclosure). In a preferred embodiment, the Krawtchouk coefficients for individual image patches are not stored; only the Krawtchouk coefficients for the classes and the list of locations for each class are stored. This reduces the amount of data to be stored.

The image patch classification data for the original document is compressed (step S17) (optional), and stored for future use (step S18). The storing step S18 may be implemented by storing the image patch classification data in a storage device 104 (see FIG. 3, described in more detail later) such as a mass storage device, or encoding the data in barcode to be printed on the hardcopy document.

The original document image is printed (step S19) to produce the printed document. As described above, barcode encoding image patch classification data may be printed on the same sheets of medium with the document. If the image patch classification data is not encoded in barcode, a barcode containing certain document identification information is printed on the same sheet with the document. The document identification information may include, for example, a document ID. This document ID is also stored in the storage device 104 in association with the image patch classification data for the document. The document ID can be used in the authentication stage to retrieve the image patch classification data stored in the storage device.

If the image patch classification data is not encoded in barcode, the printing step S19 may be performed before steps S12-S18.

The process of authenticating a target hardcopy document is shown in FIG. 1 at steps S21 to S33 (authentication stage). The target hardcopy document purports to be a copy of the original document printed in step S19.

First, the target document image (electronic form) is obtained by scanning the target hardcopy document (step S21). The target document image may be pre-processed (step S22), such as by applying denoising and de-skew processing. Then, the target document image is segmented to obtain image patches (step S23), and Krawtchouk decomposition is applied to each image patch (step S24). Segmentation of the target document image (Step S23) can be done either independently or with the guidance of the segmentation results of the original document image. The image patches are classified into a collection of classes using their Krawtchouk coefficients (step S25), and the locations of the image patches are obtained and recorded (step S26). Preferably, steps S23 to S26 use the same methods as in steps S13 to S16, respectively, of the printing stage. As a result, image patch classification data for the target document image, i.e., a list of image patch classes each being defined by a set of Krawtchouk coefficients and having associated with it a list of locations of all image patches belonging to that class, is obtained. Such data preferably has the same format as the image patch classification data for the original image.

Meanwhile, the barcode in the target document is extracted and decoded (step S27). If the barcode contains image patch classification data for the document, the data is retrieved and decompressed if necessary (step S28). If the barcode does not contain image patch classification data but contains document identification information, the document identification information is used to access the storage device 104 to retrieve image patch classification data of the original document corresponding to the document identification information, and the data decompressed if necessary (step S28).

Then, in steps S29-S32, the image patch classification data for the target document image obtained from steps S23-S26 is compared to the image patch classification data for the original document image retrieved in step S28. First, the pluralities of image patch classes for the original and target images (the original and target image patch classes, respectively) are matched to each other (step S29). This is done by comparing the Krawtchouk coefficients for each original image patch class with those of each target image patch class. In a similar manner as in steps S15 and S25, the comparison is done by calculating a distance between two sets of Krawtchouk coefficients using equation (4) (where "1" and "2" now denote the original image patch class and target image patch class, respectively). A target image patch class is deemed to be the same (i.e. matches) an original image patch class if the calculated distance is less than a threshold value $d_{th2}$ (which may be the same or different from the threshold values $d_{th1}$ used in steps S15 and S25).

The threshold value $d_{th2}$ may be determined empirically. The inventor conducted a test using a binary original image, shown in FIG. 2(c), which contains characters 0 to 9. The binary original image was printed and scanned back as a grayscale image, and the grayscale image is binarized to generate a target image. The image patches of the original image containing the characters were subject to Krawtchouk decomposition (Eqs. (1)-(3)), as were the image patches of the target image. For the Krawtchouk decomposition, all characters were normalized to 51×51 pixels (that is, M=51, N=51 in Eq. (1)); only the orders of 0 to 9 of the Krawtchouk coefficients were used (that is, u=9, v=9 in Eq. (2) and the L is 100); and $p_x$ and $p_y$ were both set to 0.5. The distances between the Krawtchouk coefficients of pairs of original and target image patches were then calculated using Eq. (4), with β=1. The result is shown in FIG. 2(d). It can be seen that the distance d between pairs of same characters were much smaller than the distance d between pairs of different characters, by an order of magnitude or more in most cases. This demonstrates that, in the matching step S29, a threshold value can be set to adequately distinguish matching and non-matching image patch classes in the original and target documents.

If, in the matching step S29, an original image patch class does not have a matching target image patch class or vice versa ("N" in step S30), all corresponding locations of the that class are deemed to be alterations in the target document (step S31). More specifically, if an original image patch class representing a symbol S1 does not have any matching target image patch class, the target document is deemed to contain deletions of the symbols S1 at locations listed for that original image patch class. Conversely, if a target image patch class representing a symbol S2 does not have any matching original image patch class, the target document is deemed to contain additions of the symbols S2 at locations listed for that target image patch class.

For each pair of original and target image patch classes that match each other ("Y" in step S30), the lists of image patch locations in the original and target image patch classes (the original list and target list) are compared to determine if they match (step S32). If a distance between a location in the target list and a location in the original list is within a predetermined threshold value, the two locations are deemed to match each other. The threshold value may be determined empirically. In one implementation, the threshold value is a percentage of the smaller dimension of the character (for example, 40%). Non-matching locations are considered alterations. More specifically, if any location in the original list does not have a matching location in the target list, the target document is deemed to contain a deletion of the corresponding symbol at that location; conversely, if any location in the target list does not have a matching location in the original list, the target document is deemed to contain an addition of the corresponding symbol at that location. Note that if a symbol in the original document is changed to a different symbol at the same location (a substitution), the substitution will manifest itself as a deletion of one symbol and an addition of another symbol. Deletions, additions and substitutions are collectively referred to as alterations.

The alterations (deletions and additions of symbols) detected in steps S31 and S32 are stored and/or displayed (step S33). The alterations may be stored or displayed in any suitable form. For example, the alterations may be stored by storing all the unmatched image patch classes with the corresponding locations detected in step S31, as well as the unmatched image patches detected in step S32. To display the alterations, an annotated original image may be displayed where the deletions and additions which may be rendered in different colors or highlighted in different colors. Alternatively, a difference image may be displayed where all matching symbols are omitted and only the deleted and added symbols (which will include substitutions of one symbol into another as explained above) are display. The annotated original image or the difference image may be reconstructed from the Krawtchouk coefficients and image patch locations obtained from steps S31 and S32. The annotated original image or the difference image may also be stored.

As mentioned above, in a preferred embodiment, the image patches correspond to individual characters of the document. In alternative embodiments, the image patches may correspond to two or more adjoining characters, or words, etc. Thus, the image segmentation step (S13 and S23) do not strictly require character segmentation. However, having image patches corresponding to multiple-characters or multiple-character words is not preferred because such image patches may be too large in size, thus requiring too many Krawtchouk terms in the decomposition. Further, because some words may only differ from each other by one or a few characters, sufficient number of Krawtchouk terms are needed in order to express the differences in the image patches. In comparison, the shape differences between individual characters are usually more significant.

If too many Krawtchouk terms are required, the amount of data to be stored will increase, which may be disadvantageous when the image patch classification data is stored in barcode on the document.

Further, if image patches contain multiple characters or multi-character words, the classes of imaged patches will correspond to multi-characters combinations rather than single characters only. In other words, the term "symbol" will include multi-characters combinations. Because there is a one-to-one correspondence between image patch classes and unique symbols, the number of possible image patch classes will greatly increase (there are many more unique multi-character combinations than unique characters). This again will increase the amount of image patch classification data to be stored.

If the image patch classification data is not stored in barcode but only stored in the storage device, then data storage amount is not an issue, so it may be acceptable to use words as image patches.

The authentication method described above can be applied to binary or gray scale images; the discrete function i(x,y) in the Eq. (1) with have either binary values or multi-bit values.

Embodiments of the present invention may be implemented in a data processing system shown in FIG. 3, which includes one or more data processing apparatus such as servers 103, a storage device 104, and one or more scanners 102 and/or printers 101 and/or multifunction or "all-in-one" machines (not shown), connected to each other by a network or other communication links. The scanners 102 (or the scanning section of the multifunction machine) may be used to obtain the original document image and the target document image in steps S11 and S21 (different scanners may be used to scan the original and target documents); the printers 101 (or the printing section of the multifunction machine) may be used to print the original document in step S19. Each server 103 includes a processor which executes computer program code stored in a memory. The steps in the printing stage (steps S11 to S19) and the steps in the authentication stage (steps S21 to S33) may be performed by different servers. Instead of separate servers, the data processing apparatus 103 may also be processors within the printer 101 and/or scanner 102 and/or multifunction machine. The storage device 104 may store the image patch classification data and can be accessed by the data processing apparatus 103. The server 103 performing the printing stage stored the image patch classification data generated in that stage in the storage device 104, and the server 103 performing the authentication stage retrieves the stored image patch classification data from the storage device 104.

In one aspect, the invention is a method performed by a data processing system. In another aspect, the invention is a data processing system performing specific methods. In another aspect, the invention is a computer program product embodied in computer usable non-transitory medium having a computer readable program code embedded therein for controlling a data processing apparatus.

It will be apparent to those skilled in the art that various modification and variations can be made in the document authentication method and related apparatus of the present invention without departing from the spirit or scope of the invention. Thus, it is intended that the present invention cover modifications and variations that come within the scope of the appended claims and their equivalents.

What is claimed is:

1. A document authentication method implemented in a data processing system, comprising:
 (a) obtaining an original document image representing an original document;
 (b) segmenting the original document image into a plurality of original image patches;
 (c) performing Krawtchouk decomposition for each original image patch to generate a set of Krawtchouk coefficients for each original image patch;
 (d) classifying the plurality of original image patches into a plurality of original image patch classes using the Krawtchouk coefficients generated in step (c), each original image patch class being defined by a set of Krawtchouk coefficients, each original image patch being classified into one and only one original image patch class, to generate a list of locations of original image patches belonging to each original image patch class, wherein the set of Krawtchouk coefficients that define each original image patch class are updated each time an original image patch is classified into that class, so that the Krawtchouk coefficients that define each class are statistical values calculated from Krawtchouk coefficients of all original image patches that have been classified into that class;
 wherein the Krawtchouk coefficients for each original image patch class and the list of locations of original image patches belonging to each original image patch class constitute original image patch classification data; and (e) storing the original image patch classification data.

2. The document authentication method of claim 1, wherein in step (d), an original image patch is classified as belonging to an original image patch class if a distance between the Krawtchouk coefficients of the original image patch and the Krawtchouk coefficients of the original image patch class is less than a first predefined threshold value.

3. The document authentication method of claim 1, wherein in step (d), the plurality of original image patch classes have a one-to-one correspondence with a plurality of unique symbols used in the original document.

4. The document authentication method of claim 1, wherein step (e) includes storing the original image patch classification data in a storage device of the data processing system, the method further comprising:
encoding document identification information as barcode; and
printing the original document image and the barcode on a medium.

5. The document authentication method of claim 1, further comprising printing the original document image on a medium,
wherein step (e) includes compressing the original image patch classification data, encoding the compressed original image patch classification data as barcode, and printing the barcode on the medium.

6. A document authentication method implemented in a data processing system, comprising:
(f) obtaining a target document image representing a target document;
(g) segmenting the target document image into a plurality of target image patches;
(h) performing Krawtchouk decomposition for each target image patch to generate a set of Krawtchouk coefficients for each target image patch;
(i) classifying the plurality of target image patches into a plurality of target image patch classes using the Krawtchouk coefficients generated in step (h), each target image patch class being defined by a set of Krawtchouk coefficients, each target image patch being classified into one and only one target image patch class, to generate a list of locations of target image patches belonging to each target image patch class, wherein the set of Krawtchouk coefficients that define each target image patch class are updated each time a target image patch is classified into that class, so that the Krawtchouk coefficients that define each class are statistical values calculated from Krawtchouk coefficients of all target image patches that have been classified into that class;
wherein the Krawtchouk coefficients for each target image patch class and the list of locations of target image patches belonging to each target image patch class constitute target image patch classification data;
(j) retrieving original image patch classification data which has been generated for an original document image, the original image patch classification data comprising Krawtchouk coefficients for each of a plurality of original image patch classes and a list of locations of original image patches belonging to each original image patch class; and
(k) detecting alterations in the target document image relative to the original document image by comparing the target image patch classification data and the original image patch classification data.

7. The document authentication method of claim 6, wherein step (k) comprises:
(k1) matching the plurality of target image patch classes with the plurality of original image patch classes, by comparing their respective Krawtchouk coefficients, to detect any original image patch classes that do not match any target image patch classes and any target image patch classes that do not match any original image patch classes; and
(k2) for each target image patch class that matches an original image patch class, matching the list of locations of target image patches belonging to that target image patch class with the list of locations of original image patches belonging to that original image patch class to detect any locations of original image patches that do not match any locations of target image patches and any locations target image patches that do not match any locations of original image patches.

8. The document authentication method of claim 7, wherein in step (k1), a target image patch class matches an original image patch class if a distance between the Krawtchouk coefficients of the target image patch class and the Krawtchouk coefficients of the original image patch class is less than a second predefined threshold value.

9. The document authentication method of claim 7, wherein in step (k2), a location of original image patch matches a location of target image patch if a distance between these two locations is less than a third predefined threshold value.

10. The document authentication method of claim 6, wherein step (f) comprises scanning a hardcopy document containing the original document and a barcode, and wherein step (j) comprises:
decoding the barcode to obtain document identification information;
accessing a storage device of the data processing system to retrieve the original image patch classification data.

11. The document authentication method of claim 6, wherein step (f) comprises scanning a hardcopy document containing the original document and a barcode, and wherein step (j) comprises decoding the barcode to retrieve the original image patch classification data.

12. A computer program product comprising a computer usable non-transitory medium having a computer readable program code embedded therein for controlling a data processing system, the computer readable program code configured to cause the data processing system to execute a document authentication process which comprises:
(a) obtaining an original document image representing an original document;
(b) segmenting the original document image into a plurality of original image patches;
(c) performing Krawtchouk decomposition for each original image patch to generate a set of Krawtchouk coefficients for each original image patch;
(d) classifying the plurality of original image patches into a plurality of original image patch classes using the Krawtchouk coefficients generated in step (c), each original image patch class being defined by a set of Krawtchouk coefficients, each original image patch being classified into one and only one original image patch class, to generate a list of locations of original image patches belonging to each original image patch class, wherein the set of Krawtchouk coefficients that define each original image patch class are updated each time an original image patch is classified into that class, so that the Krawtchouk coefficients that define each class are statistical values calculated from Krawtchouk coefficients of all original image patches that have been classified into that class;

wherein the Krawtchouk coefficients for each original image patch class and the list of locations of original image patches belonging to each original image patch class constitute original image patch classification data; and (e) storing the original image patch classification data.

13. The computer program product of claim 12, wherein in step (d), an original image patch is classified as belonging to an original image patch class if a distance between the Krawtchouk coefficients of the original image patch and the Krawtchouk coefficients of the original image patch class is less than a first predefined threshold value.

14. The computer program product of claim 12, wherein in step (d), the plurality of original image patch classes have a one-to-one correspondence with a plurality of unique symbols used in the original document.

15. The computer program product of claim 12, wherein step (e) includes storing the original image patch classification data in a storage device of the data processing system, the process further comprising:

encoding document identification information as barcode; and printing the original document image and the barcode on a medium.

16. The computer program product of claim 12, wherein the process further comprises printing the original document image on a medium, and wherein step (e) includes compressing the original image patch classification data, encoding the compressed original image patch classification data as barcode, and printing the barcode on the medium.

17. A computer program product comprising a computer usable non-transitory medium having a computer readable program code embedded therein for controlling a data processing system, the computer readable program code configured to cause the data processing system to execute a document authentication process which comprises:

(f) obtaining a target document image representing a target document;

(g) segmenting the target document image into a plurality of target image patches;

(h) performing Krawtchouk decomposition for each target image patch to generate a set of Krawtchouk coefficients for each target image patch;

(i) classifying the plurality of target image patches into a plurality of target image patch classes using the Krawtchouk coefficients generated in step (h), each target image patch class being defined by a set of Krawtchouk coefficients, each target image patch being classified into one and only one target image patch class, to generate a list of locations of target image patches belonging to each target image patch class, wherein the set of Krawtchouk coefficients that define each target image patch class are updated each time a target image patch is classified into that class, so that the Krawtchouk coefficients that define each class are statistical values calculated from Krawtchouk coefficients of all target image patches that have been classified into that class;

wherein the Krawtchouk coefficients for each target image patch class and the list of locations of target image patches belonging to each target image patch class constitute target image patch classification data;

(j) retrieving original image patch classification data which has been generated for an original document image, the original image patch classification data comprising Krawtchouk coefficients for each of a plurality of original image patch classes and a list of locations of original image patches belonging to each original image patch class; and (k) detecting alterations in the target document image relative to the original document image by comparing the target image patch classification data and the original image patch classification data.

18. The computer program product of claim 17, wherein step (k) comprises:

(k1) matching the plurality of target image patch classes with the plurality of original image patch classes, by comparing their respective Krawtchouk coefficients, to detect any original image patch classes that do not match any target image patch classes and any target image patch classes that do not match any original image patch classes; and (k2) for each target image patch class that matches an original image patch class, matching the list of locations of target image patches belonging to that target image patch class with the list of locations of original image patches belonging to that original image patch class to detect any locations of original image patches that do not match any locations of target image patches and any locations target image patches that do not match any locations of original image patches.

19. The computer program product of claim 18, wherein in step (k1), a target image patch class matches an original image patch class if a distance between the Krawtchouk coefficients of the target image patch class and the Krawtchouk coefficients of the original image patch class is less than a second predefined threshold value.

20. The computer program product of claim 18, wherein in step (k2), a location of original image patch matches a location of target image patch if a distance between these two locations is less than a third predefined threshold value.

21. The computer program product of claim 17, wherein step (f) comprises scanning a hardcopy document containing the original document and a barcode, and wherein step (j) comprises:

decoding the barcode to obtain document identification information;

accessing a storage device of the data processing system to retrieve the original image patch classification data.

22. The computer program product of claim 17, wherein step (f) comprises scanning a hardcopy document containing the original document and a barcode, and wherein step (j) comprises decoding the barcode to retrieve the original image patch classification data.

* * * * *